United States Patent [19]

Turk

[11] 4,000,519
[45] Dec. 28, 1976

[54] CASSETTE AND APPARATUS FOR TAPE RECORDINGS ON BOTH TAPE SIDES

[75] Inventor: Everardus Theodorus Gerardus Turk, Eindhoven, Netherlands

[73] Assignee: U.S. Philips Corporation, New York, N.Y.

[22] Filed: May 1, 1975

[21] Appl. No.: 573,471

[30] Foreign Application Priority Data

May 13, 1974  Netherlands ............... 7406377

[52] U.S. Cl. ........................... 360/132; 242/206; 242/208; 360/96
[51] Int. Cl.² .............. G11B 23/08; G11B 5/78; G11B 15/32; G11B 15/60
[58] Field of Search ............. 360/132, 96, 85, 93; 242/74, 76, 200, 202, 197–199, 206–208

[56] References Cited

UNITED STATES PATENTS

| | | | |
|---|---|---|---|
| 1,317,404 | 9/1919 | Thomas | 242/192 |
| 2,912,179 | 11/1959 | Schuyler | 242/200 |
| 3,767,137 | 10/1973 | Richt | 360/96 |
| 3,826,489 | 7/1974 | Watkins, Jr. | 360/132 |

*Primary Examiner*—Alfred H. Eddleman
*Attorney, Agent, or Firm*—Frank R. Trifari; David R. Treacy

[57] ABSTRACT

A cassette and an apparatus for use with such a cassette. The cassette housing has openings in two opposite side walls, and contains a tape which is suited for recording purposes at both sides, passed from one hub over guide elements along a side wall, then crossing over substantially diagonally to a tape guide element near the diagonally opposed corner, passed along the opposite sidewall and finally over a subsequent guide element to the other, counter-rotating, winding hub.

7 Claims, 5 Drawing Figures

CASSETTE AND APPARATUS FOR TAPE RECORDINGS ON BOTH TAPE SIDES

BACKGROUND OF THE INVENTION

The invention relates to a cassette and an apparatus for recording and/or reproducing information, such as music, speech, television pictures, and digital pulses, etc. on tape, hereinafter called recording information; and more particularly, of the type comprising a cassette housing, a record carrier in the form of a thin tape which is accommodated in the cassette housing, two winding hubs for the tape which are rotatable relative to the cassette housing about substantially parallel axes, said housing having at least one opening in a side wall for an information-recording and/or read device which cooperates with the tape, hereinafter referred to as a recording information device, and a plurality of tape guide elements for guiding the tape, in planes parallel to the axes of the winding hubs, from a winding hub along one side of the cassette housing past said opening, to the other winding hub.

Cassettes of this type, which are generally known as two-hole cassettes, because the cassette has two holes for driving the two winding hubs, are known in several types and embodiments. Two-hole cassettes are frequently employed, for example, for single-8 film and for magnetic tape, such as the well-known "compact cassette."

SUMMARY OF THE INVENTION

The object of the invention to provide a cassette and apparatus suitable for use with tape that can be used for information recording, on both sides.

According to the invention a cassette housing has openings in two opposed side walls for a recording information device which cooperates with the tape, a tape guide element is disposed at least near each of the four corners of the cassette housing, and the tape, coming from a winding hub, is led over guide elements along one side wall past the opening, then crosses over substantially diagonally to a tape guide element near the diagonally opposed corner, to be subsequently led along the other side wall past its opening and finally to the other winding hub.

Thus, the invention provides a cassette in which the tape is fed past the openings in one side wall with one side outward and subsequently past the openings in the other side wall with its other side, outward which consequently means that the two sides of the tape are accessible at opposite sides of the cassette.

In a preferred embodiment of the invention the part of the tape crossing diagonally is guided by the packs of the tape which are wound on to the winding cores. Advantage of this embodiment is that the cassette dimensions can be minimized. The guidance of the diagonally crossing part of the tape on the reel packs does not give rise to problems due to differences in speed between the diagonally crossing part of the tape and the tape on the reels, because the diagonally extending part of the tape runs over the reel packs at that side where the circumferential velocity is in the same direction as diagonal tape travel. Furthermore, as the absolute magnitude of the tape speed is the same everywhere, there will be no relative movement between the tape on the reel and the crossing part at the locations where the diagonally crossing tape part engages the packs.

In a further preferred embodiment the cassette housing is externally substantially rotation-symmetrical relative to an axis parallel to the axes of the winding hubs, which axis passes through the point of intersection of the diagonals of the cassette housing. In an apparatus which is equipped with a single recording information device only, such a cassette may be fitted in any position to the apparatus, while the device can always cooperate with the tape through the opening provided for this purpose in the side wall of the cassette.

In a recording information apparatus according to the invention, at either side of an imaginary plane which passes through the axes of the winding spindles for the winding hubs of the cassette, and at substantially equal distances therefrom, corresponding magnetic heads and capstans are disposed for cooperation, information devices such as with opposite sides of the tape.

BRIEF DESCRIPTION OF THE DRAWINGS

The invention will now be described in more detail with reference to the drawing, which shows an embodiment of the invention, and in which.

DESCRIPTION OF THE PREFERRED EMBODIMENTS

Figure 1:
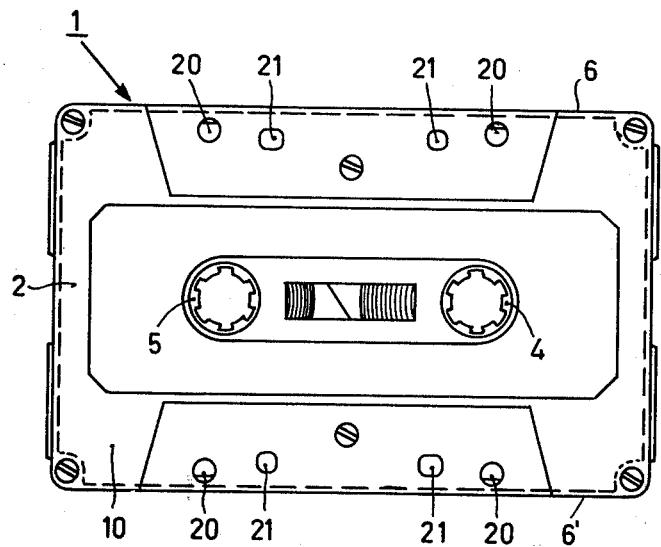
FIG. 1 is a top view of a magnetic-tape cassette having a plastic housing which consists of two substantially identical sections.

The cassette 1 of FIG. 1 comprises a generally rectangular cassette housing 2 in which a record carrier in the form of a thin magnetic tape 3 is accommodated. In the cassette housing two winding hubs 4 for the tape are disposed which are rotatable relative to the housing about substantially parallel axes. Said hubs are made of a plastic and are rotatably journalled relative to the cassette housing 2 with the aid of annular slightly raised parts of the housing 2, not shown, as usual in the well-known compact cassettes. In the opposed long side walls 6 and 6' of the cassette housing openings 7, 8 and 9 are formed at equal distances from each other. The center opening 8 is situated in the center of the side wall 6 and serves for receiving into the housing a recording information device such as a recording/playback head of a magnetic-tape apparatus; the two other openings 7 and 9 serve similarly for passage of an erase head and a pressure roller.

The cassette housing consists of two substantially identical sections 10 and 11. Near the four corners of the cassette housing tape guide-elements 12, 13, 14 and 15 are disposed, which consist of identical plastic rollers rotatable on pins 16. Alternatively, they may be integral with the housing section 11 or may consist of metal pins mounted in said housing section.

Figure 2:
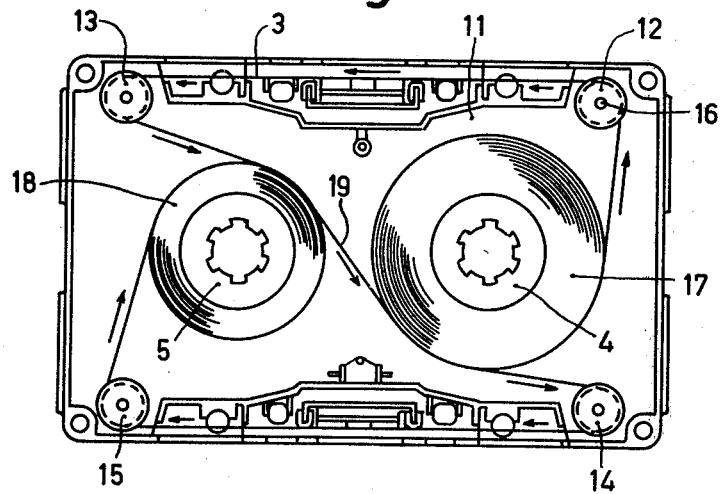
FIG. 2 is a top view of the magnetic tape cassette of FIG. 1, the upper section of the cassette housing being removed.
Figure 3:
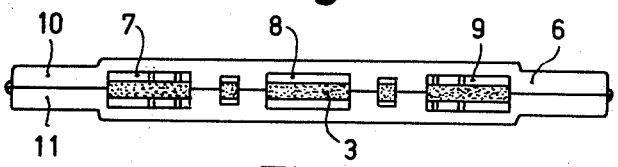
FIG. 3 is a side view of one of the long sides of the cassette of FIG. 1.

As shown in FIG. 2 parts of the tape 3 wound on the counter-rotating winding hubs 4 and 5 from tape packs 17 and 18. The tape which comes from the winding hub 4 is passed over the roller 12 along a side wall of the cassette housing past the openings towards the roller 13, from where it then crosses over substantially diagonally to the roller 14 near the diagonally opposed corner, to be subsequently passed along the other side wall 6 and finally via the roller 15 to the reel 18 on the winding hub 5.

The diagonal crossing portion 19 of the tape 3 is guided by the tape packs 17 and 18. At the locations where the tape portion 19 makes contact with the packs 17 and 18 the portion 19 moves in the same direction as the respective pack 17 and 18 peripheries and, moreover, has the same speed. Therefore, problems dive to relative movement will not occur. The packs 17 and 18 thus have a guiding function for the crossing part of the tape, which, especially in the case of cassettes in which the winding hubs are provided with flanges, also ensures correct lateral guidance.

The cassette shown in the figures comprises a cassette housing 2 which is (externally) substantially rotation-symmetrical relative to an axis which passes through the point of intersection of the diagonals of the housing and therefore parallel to the axes of the winding hubs 4 and 5. In FIG. 1 this symmetry axis is perpendicular to the plane of the drawing, midway between the winding hubs 4 and 5. As a result of said symmetry, the cassette can be fitted on a suitable magnetic-tape apparatus in any desired position, the tape being always correctly presented to the magnetic heads. For cooperation with a magnetic-tape apparatus the cassette is furthermore provided with openings 20 and 21, the first opening serving for the passage of a capstan and the latter opening for the passage of locating pins.

Although the invention has been described hereinbefore with reference to an embodiment which bears a close resemblance to the known compact set for audio purposes, the scope of the invention is by no means limited to such an embodiment. The invention might successfully be used in cassettes which contain a record carrier of a different type, such as for example a paper-strip or a tape suitable for optical recordings, while the cassette may have an entirely different shape and for example need not be suitable for the insertion of a recording and/or reading device. Neither it is necessary that the tape is located completely inside the cassette; it is alternatively possible that the tape extends partly outside the cassette, as is for example the case with the known single-8 cassettes for cinematographic film and with video cassettes for a video recorder, in which a loop is pulled out of the cassette which is fed past the rotary magnetic heads.

Figure 4:
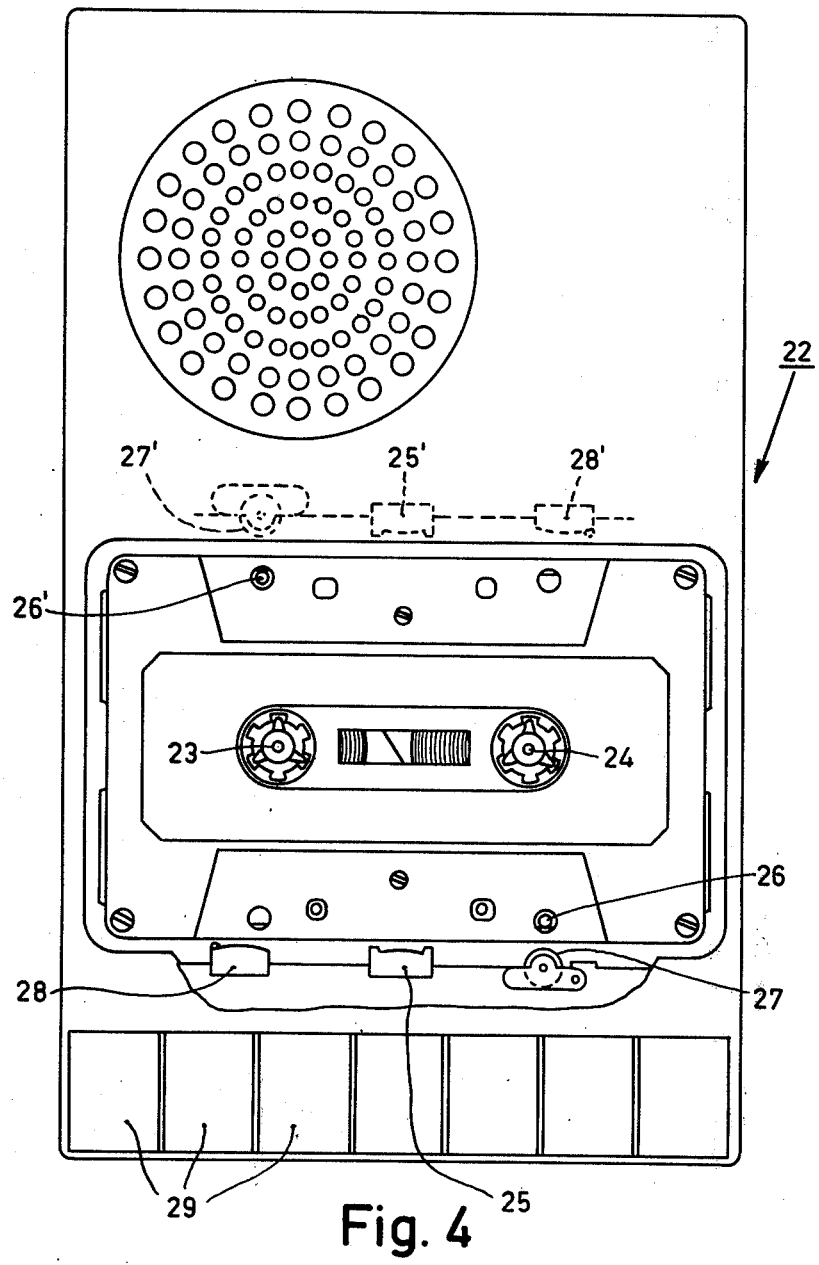
FIG. 4 is a top, part sectional view of a magnetic-tape recording/playback apparatus with two identical recording/playback units which cooperate with opposite sides of the cassette.

FIG. 4 shows an audio-cassette recording/playback apparatus 22, in which at either side of a plane through the axes of two counter-rotating winding spindles 23 and 24, and at approximately equal distances therefrom, two recording/playback heads 25 and 25', two capstans 26 and 26', two pressure rollers 27 and 27', as well as two erase heads 28 and 28' are disposed. The heads 25 and 28 and the pressure roller 27 can together be moved towards and away from the cassette in the manner usual with the known cassette recorders. The same applies to the heads 25' and 28' together with the pressure roller 27'.

The apparatus is provided with a number of buttons 29 for actuation. These enable either the assembly 25-27-28 or the assembly 25'-27'-28' to cooperate with the cassette 1. The capstans 26 and 26' have the same direction of rotation, so that they drive the tape 3 in opposite directions. The apparatus is suited for the continuous playback of the tape by providing automatic change-over of the assembly 25-27-28 to 25'-27'-28', and vice versa, when the end of the tape is reached.

What is claimed is:

1. A cassette for an elongated tape comprising a housing having a first side wall with an opening in the side wall; two winding hubs mounted in the housing for rotation about parallel axes; a length of tape arranged in the housing, wound on and extending between the hubs; a plurality of tape guide elements arranged in the housing for guiding the tape in planes parallel to the axes of the hubs, from one winding hub along said side wall past the opening, wherein
said housing has a second side wall opposite said first side wall, having an opening therein, and said plurality of tape guide elements comprises four elements disposed near four corners of a rectangle, the tape being guided from one hub over a first element, then along the first side wall and over a second element, then substantially diagonally to a third element near the corner diagonally opposite said second element, then along the second side wall past the opening, and then over the fourth element to the other hub which counter-rotates, whereby a tape surface which is the outside surface along said first side wall opening is the inside surface along the second side wall opening.

2. A cassette as claimed in claim 1, wherein said tape in passing between the second and third elements is guided by the tape packs wound on the winding hubs.

3. A cassette as claimed in claim 1, wherein said first and second side wall openings are adapted for receiving a recording information device for operative cooperation with the tape passing said opening.

4. A cassette as claimed in claim 1, wherein said housing is generally rectangular and substantially rotation symmetrical about an axis parallel to and midway between the hub axes.

5. A cassette as claimed in claim 4, wherein said first and second side walls each have a plurality of openings for receiving devices therethrough for operative cooperation with the tape, and said housing also has respective openings adjacent said first and second side walls for passage therethrough of a tape drive capstan.

6. A recording information apparatus having two counter-rotating winding spindles having parallel axes; means for positioning a tape cassette on said spindles, said cassette having openings on two opposite side walls for receiving a recording information device for operative cooperation with the tape; and a plurality of capstans and recording information devices; at least one each respectively disposed at opposite sides of the spindles for operative cooperation with opposite sides of the tape.

7. An apparatus as claimed in claim 6, wherein said capstans and recording information devices are arranged approximately in rotation symmetrical relationship about an axis parallel to and midway between said winding spindles.

* * * * *